US010466648B2

(12) United States Patent
Lee et al.

(10) Patent No.: US 10,466,648 B2
(45) Date of Patent: Nov. 5, 2019

(54) HOLOGRAPHIC DISPLAY

(71) Applicant: LG Display Co., Ltd., Seoul (KR)

(72) Inventors: Yong-Ku Lee, Gimpo-si (KR);
Ju-Seong Park, Goyang-si (KR);
Hyung-Seok Bang, Goyang-si (KR);
Dong-Yeon Kim, Busan (KR)

(73) Assignee: LG Display Co., Ltd., Seoul (KR)

( * ) Notice: Subject to any disclaimer, the term of this patent is extended or adjusted under 35 U.S.C. 154(b) by 345 days.

(21) Appl. No.: 15/358,717

(22) Filed: Nov. 22, 2016

(65) Prior Publication Data

US 2017/0155894 A1    Jun. 1, 2017

(30) Foreign Application Priority Data

Nov. 27, 2015    (KR) .................. 10-2015-0167927

(51) Int. Cl.
| | | |
|---|---|---|
| *G03H 1/00* | (2006.01) | |
| *G03H 1/26* | (2006.01) | |
| *G03H 1/02* | (2006.01) | |
| *G03H 1/22* | (2006.01) | |
| *G02B 27/22* | (2018.01) | |

(52) U.S. Cl.
CPC ......... *G03H 1/0005* (2013.01); *G02B 27/225* (2013.01); *G03H 1/02* (2013.01); *G03H 1/2249* (2013.01); *G03H 1/268* (2013.01); *G03H 2001/0088* (2013.01); *G03H 2001/0224* (2013.01); *G03H 2001/2271* (2013.01); *G03H 2223/23* (2013.01); *G03H 2225/13* (2013.01)

(58) Field of Classification Search
CPC ...... G03H 1/0005; G03H 1/02; G03H 1/2249; G03H 1/268; G03H 2001/0088; G03H 2001/0224; G03H 2001/2271; G03H 2223/23; G03H 2225/13; G02B 27/225
USPC .......................................................... 348/41
See application file for complete search history.

(56) References Cited

U.S. PATENT DOCUMENTS

| | | | |
|---|---|---|---|
| 10,054,793 B2 * | 8/2018 | An ................... | G02B 27/225 |
| 2010/0045781 A1 * | 2/2010 | Flon .................. | G03H 1/2205 |
| | | | 348/51 |

(Continued)

FOREIGN PATENT DOCUMENTS

| | | |
|---|---|---|
| CN | 102483605 A | 5/2012 |
| CN | 102799021 A | 11/2012 |

(Continued)

OTHER PUBLICATIONS

Office Action dated Dec. 5, 2018 with English translation issued in the corresponding Chinese Patent Application No. 201611052767.4, pp. 1-21.

*Primary Examiner* — William C Vaughn, Jr.
*Assistant Examiner* — Jae N Noh
(74) *Attorney, Agent, or Firm* — Polsinelli PC

(57) ABSTRACT

Disclosed herein is a holographic display which enables stereoscopic display of colors by changing a structure and mitigates a flickering effect by lowering the response speed. The holographic display may deliver an image to different positions for the left eye and right eye at the same time, thereby lowering the frequency necessary for supply of holographic image information. Thereby, the holographic display may address the issues of the afterimage effect and flickering effect in a liquid crystal panel-based spatial light modulator.

20 Claims, 6 Drawing Sheets

(56) References Cited

U.S. PATENT DOCUMENTS

| | | | | |
|---|---|---|---|---|
| 2012/0069154 | A1* | 3/2012 | Talstra | H04N 13/167 |
| | | | | 348/51 |
| 2014/0016070 | A1* | 1/2014 | Choi | G02F 1/1339 |
| | | | | 349/106 |
| 2014/0300839 | A1* | 10/2014 | Choe | G02F 1/1313 |
| | | | | 349/15 |
| 2016/0255338 | A1* | 9/2016 | Song | H04N 13/398 |
| | | | | 348/47 |
| 2016/0353092 | A1* | 12/2016 | Bruder | H04N 13/39 |

FOREIGN PATENT DOCUMENTS

| | | | |
|---|---|---|---|
| CN | 103108207 | A | 5/2013 |
| CN | 103116228 | A | 5/2013 |
| WO | 95/34008 | A1 | 12/1995 |

\* cited by examiner

HOLOGRAPHIC DISPLAY

CROSS-REFERENCE TO RELATED APPLICATION

This application claims the benefit of Korean Patent Application No. 10-2015-0167927, filed in the Republic of Korea on Nov. 27, 2015, which is hereby incorporated by reference in its entirety as if fully set forth herein.

BACKGROUND

Field of the Disclosure

The present disclosure relates to a display device, and more particularly, to a holographic display. Although the present disclosure is suitable for a wide scope of applications, it is particularly suitable for implementing a holographic display with a stereoscopic display of colors by changing a structure and mitigating flickering by lowering a response speed.

Discussion of the Background

While a conventional two-dimensional image system provides planar images, a three-dimensional image system displays actual image information about an object for observers. In this sense, the three-dimensional image system may be considered as the ultimate image display technology.

As techniques for reproducing three-dimensional stereoscopic images, stereoscopy, holography and integral imaging are under development. Among these technologies, holography enables an observer to see the same stereoscopic image as a real object without wearing goggles in viewing the holographic image created using laser light. For this reason, holography is known as the most ideal technology that produces an excellent stereoscopic effect to observers without causing eye fatigue.

Holography requires a spatial light modulator. The spatial light modulator functions to adjust transmittance of light or output phase information about light. Stereoscopy is a technology to separate an image into an image for the left eye and an image for the right eye. This technology allows observers to recognize a three-dimensional image based on binocular disparity by providing different pieces of information to both eyes. In contrast, holography presents distances and depths using the effect of interference of light. In holography, when light is emitted from a light source such as laser, which has an interference property, information about an interference image is delivered to the spatial light modulator. Then, the spatial light modulator outputs a three-dimensional image by diffracting the delivered interference image information.

Meanwhile, for a holographic display, which utilizes coherent diffraction of light, the diffraction capability is determined by the pixel size of the spatial light modulator (SLM), and a viewing window which is viewable by a viewer is determined by the diffraction capability. That is, as the pixel size of the SLM decreases, the diffraction capability increases, and a higher diffraction capability provides a wider viewing window. However, the pixel size, which is related to resolution, has limitations regarding processes. Accordingly, the viewing window obtained with an actually realized pixel size is only the size of a pupil of the viewer.

In addition, when stereoscopic display of colors is performed using a holographic display, it is impossible to transmit rays of light in different colors at the same time because the diffraction angle varies among the wavelengths of the rays of the respective colors. Thus, images of different colors are supplied at different times. Moreover, for one color, the left eye and right eye cannot be covered by one viewing window, and thus an image to be supplied to the viewer is divided into an image for the left eye and an image for the right eye. Accordingly, for a typical holographic display, a high response speed greater than the multiplication of a response speed necessary for display and a value of hue necessary for colors to be realized is required, and thus issues such as afterimage effect and flickering are raised in implementing stereoscopic display of colors.

SUMMARY

Accordingly, the present disclosure is directed to a holographic display that substantially obviates one or more problems due to limitations and disadvantages of the prior art.

An object of the present disclosure is to provide a holographic display which enables stereoscopic display of colors by changing a structure and mitigates flickering by lowering a response speed.

Additional advantages, objects, and features of the disclosure will be set forth in part in the description which follows and in part will become apparent to those having ordinary skill in the art upon examination of the following or may be learned from practice of the disclosure. The objectives and other advantages of the invention may be realized and attained by the structure particularly pointed out in the written description and claims hereof as well as the appended drawings.

To achieve this object and other advantages and in accordance with the purpose of the disclosure, as embodied and broadly described herein, a holographic display may deliver an image to different positions for the left eye and right eye at the same time, thereby lowering the frequency necessary for supply of holographic image information. Thereby, the holographic display may address the issues of the afterimage effect and flickering which occur in a liquid crystal panel-based spatial light modulator.

In one aspect of the present disclosure, a holographic display incudes a backlight unit configured to transmit collimated light, a spatial light modulator over the backlight unit to supply holographic image information, a diffractive interference film over the spatial light modulator and comprising a plurality of first areas and a plurality of second areas for delivering the holographic image information to two different positions, the plurality of first areas and the plurality of second areas being arranged in an alternating manner, and a steering unit over the diffractive interference film to shift holographic image information from the diffractive interference film according to a position of a viewer.

Herein, the diffractive interference film may have a first interference pattern configured to concentrate the holographic image information from the first areas toward the left eye of the viewer and a second interference pattern configured to concentrate the holographic image information from the second areas toward a right eye of the viewer.

The diffractive interference film may be formed by lamination of a base film and a photoreactive medium layer, wherein the photoreactive medium layer may be divided into the first areas and the second areas.

In addition, the first areas may respectively have first interference patterns different from each other, and the second areas may respectively have second interference patterns different from each other.

The two positions for the holographic image information from the diffractive interference film may be spaced apart a distance, the distance being equivalent to a distance between a left eye and a right eye of the viewer.

The spatial light modulator may sequentially project red holographic image information, green holographic image information, and blue holographic image information within one frame, wherein each of the red holographic image information, green holographic image information, and blue holographic image may have holographic image information for a left eye and holographic image information for a right eye.

The spatial light modulator may be a first liquid crystal panel configured to receive reference light coming from an outside and project the collimated light from the backlight unit by modulating an amplitude and phase of the collimated light.

The steering unit may include an eye tracking unit configured to track the position of the viewer.

Further, the steering unit may be a second liquid crystal panel configured to horizontally shift the holographic image information from the diffractive interference film while maintaining a phase and amplitude of the holographic image information.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspect(s) of the disclosure and together with the description serve to explain the principle of the disclosure. In the drawings.

DETAILED DESCRIPTION

Reference will now be made in detail to aspects of the present disclosure, examples of which are illustrated in the accompanying drawings. Wherever possible, the same reference numbers will be used throughout the drawings to refer to the same or like parts. In describing aspects disclosed in this specification, relevant well-known technologies are constructions may not be described in detail to avoid obscuring the subject matter of the present disclosure. As used herein, the names of the constituents are employed to facilitate preparation of this specification and may be different from the names of components of a real product.

Figure 1:
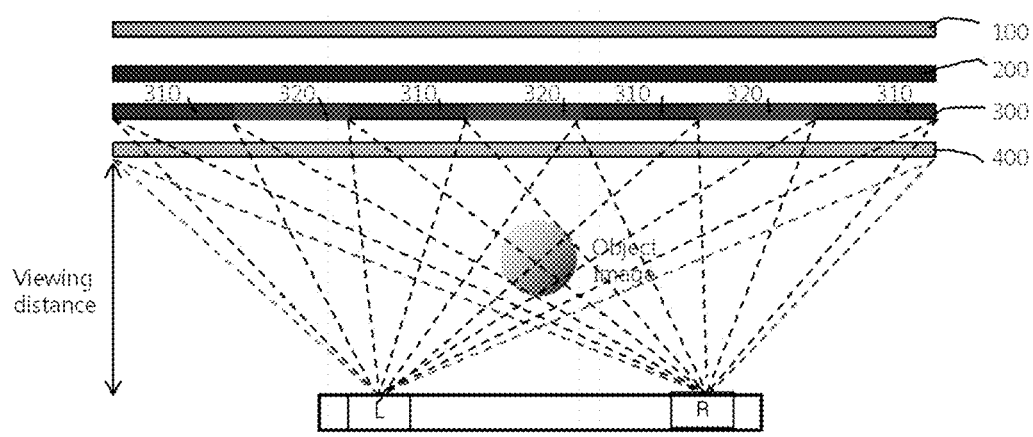
FIG. 1 is a schematic diagram illustrating a holographic display according to an aspect of the present disclosure.
Figure 2:
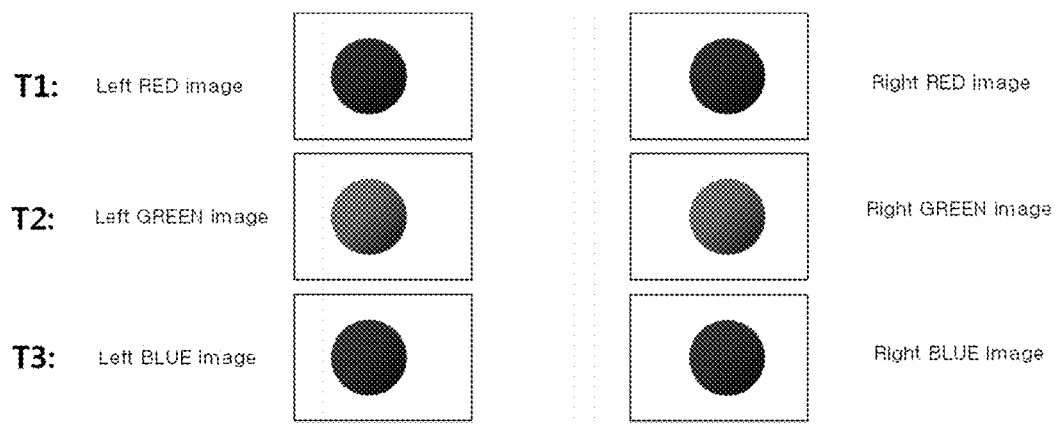
FIG. 2 illustrates images provided to the left and right viewing windows through the holographic display of FIG. 1 at different times.

FIG. 1 is a schematic diagram illustrating a holographic display according to an aspect of the present disclosure, and FIG. 2 illustrates images provided at the left and right viewing windows through the holographic display of FIG. 1 at different times.

As shown in FIG. 1, a holographic display of the present disclosure includes a backlight unit 100 configured to transmit collimated light, a spatial light modulator 200 positioned over the backlight unit 100 to supply holographic image information, a diffractive interference film 300 positioned on the spatial light modulator 200 and having a plurality of first areas 310 and second areas 320 arranged in an alternating manner to deliver holographic image information to two different positions, and a steering unit 400 positioned over the diffractive interference film 300 to shift holographic image information transmitted from the diffractive interference film 300 according to the position of a viewer.

Herein, the backlight unit 100, which serves to transmit collimated light toward the spatial light modulator 200, may include a light source of a specific wavelength and an optical device configured to guide light toward the spatial light modulator 200. Herein, the light source may include a plurality of light sources according to the colors to be represented. For example, a plurality of light sources of different wavelengths of red, green and blue may be provided. In addition, as red light, green light and blue light have different wavelengths, they have different diffraction angles. Accordingly, the holographic display drives the light sources sequentially. For example, the hollow display scheduling drives the red light source, the green light source, and the blue light source in this order.

Laser with good coherence as a light source for the holographic display can be used, but it is also possible for the holographic display to further include an optical device such as a light guide plate capable of guiding collimated light. The optical device may be implemented as a light emitting diode (LED). It should be noted that light emitted from the backlight unit 100 is collimated light. This configuration may be implemented in various different forms.

As shown in FIG. 2, the spatial light modulator 200 sequentially emits red holographic image information, green holographic image information and blue holographic image information at a first time T1, a second time T2, and a third time T3, respectively. Herein, each of the red holographic image information, the green holographic image information, and the blue holographic image information includes holographic image information for the left eye and holographic image information for the right eye. Thereby, a holographic image for the left eye and a holographic image for the right eye are projected from the spatial light modulator 200 simultaneously.

The spatial light modulator 200 may receive external incident reference light, project the collimated light arriving from the backlight unit 100 by modulating the amplitude and phase thereof. The holographic image information is presented through modulation of the amplitude and phase. The holographic image information may be adjusted by an external host or a signal processor which is connected to the spatial light modulator 200. The holographic image information may change on a frame-by-frame basis or on a color-by-color basis in a frame.

The diffractive interference film 300 includes a first interference pattern for concentrating the holographic image information from the first areas 310 toward the left eye of the viewer, and a second interference pattern for concentrating the holographic image information from the second areas 320 toward the right eye of the viewer. In the diffractive interference film 300, the first areas 310 and the second areas 320 serve to concentrate the holographic image information in two different directions. The distance between the two points at which the two images are concentrated through the diffractive interference film 300 corresponds to the distance between the eyes of the viewer. The distance between the eyes of a viewer is about 60 mm to about 75 mm. The holographic image information may be concentrated at two different points through the diffractive interference film 300, defining the distance between the eyes of the viewer as an average, 65 mm.

The steering unit 400 horizontally shifts the holographic image information coming from the diffractive interference film 300, while maintaining the phase and amplitude of the holographic image information. The steering unit 400 is responsible for horizontally shifting an image projected onto the diffractive interference film 300 at a viewing distance. The steering unit 400 directs the holographic images to the eyes of the viewer by changing the positions thereof. This is because the viewing windows of the images concentrated through the diffractive interference film 300 are as small as a pupil, and thus even a slight movement of the viewer causes the viewing windows to mismatch the size of the pupil of a single eye.

Herein, since two holographic images of the holographic image information corresponding to the left eye and right eye are projected onto specific viewing windows at different positions in two different directions through the diffractive interference film 300 while being separated from each other by a distance corresponding to the distance between the eyes of the viewer, the steering unit 400 serves to shift the positions of the windows in a virtual horizontal plane at the viewing distance.

Figure 3A:
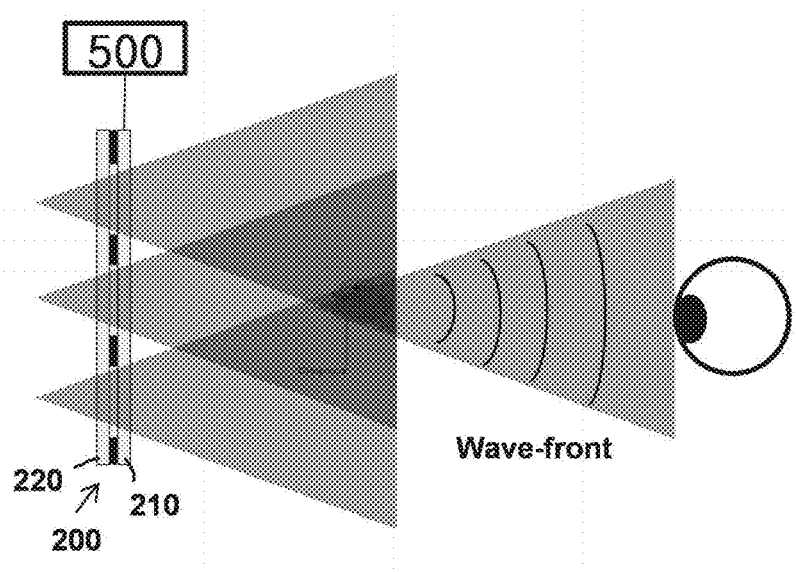
FIGS. 3A and 3B are a side view and a cross-sectional view illustrating a spatial light modulator of a holographic display according to an aspect of the present disclosure.
Figure 3B:
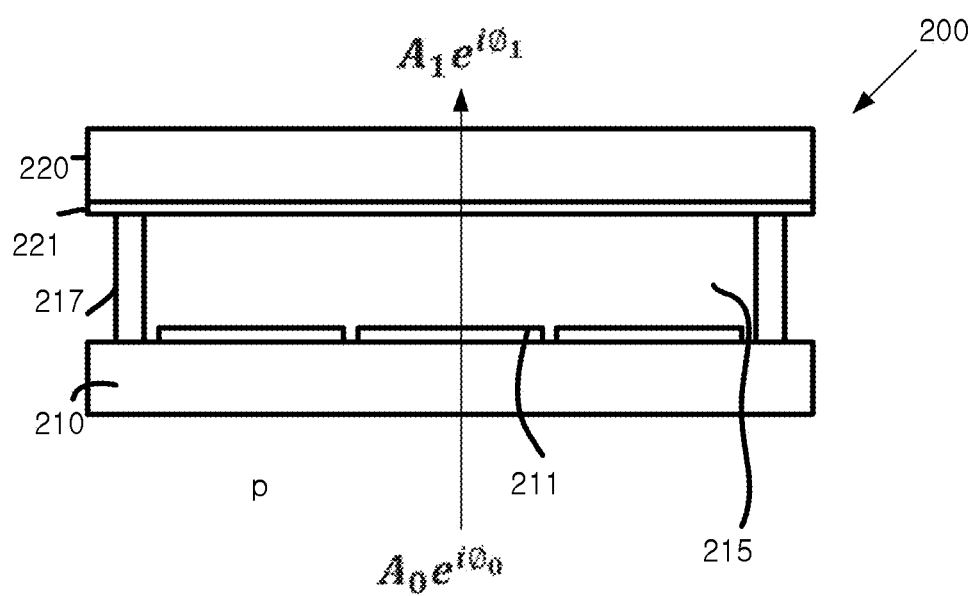

FIGS. 3A and 3B are a side view and a cross-sectional view illustrating a spatial light modulator of a holographic display according to an aspect of the present disclosure.

As shown in FIG. 3B, the spatial light modulator 200 includes a first substrate 210 and a second substrate 220 facing each other and each having a plurality of pixels, a first electrode 211 arranged on each pixel of the first substrate 210, a second electrode 221 positioned on the inner surface of the second substrate 220 to face the first electrode 211, a liquid crystal layer 215 positioned between the first substrate 210 and the second substrate 220, and a seal pattern 217 positioned at the edges of the first and second substrates 210, 220 between the first substrate 210 and the second substrate 220. The illustrated spatial light modulator is a kind of liquid crystal panel. In this aspect, modulation of amplitude (from A0 to A1) and modulation of phase (from Φ0 to Φ1) are performed simultaneously using one liquid crystal panel. Alternatively, two liquid crystal panels may be provided to perform modulation of phase and amplitude without causing any error.

When the holographic image of a specific object needs to be presented, the spatial light modulator 200 forms the same wave front as formed when a real object is on the spatial light modulator 200, as shown in FIG. 3A. Thereby, the spatial light modulator 200 produces an effect of making the viewer feel that the object is at the corresponding position.

FIG. 3A schematically illustrates a case where the spatial light modulator 200 receives reference light and projects collimated light transmitted from the backlight unit by changing the amplitude and phase of the collimated light. The spatial light modulator 200 is connected to a signal processor 500, and is thus provided with holographic image information on a frame-by-frame basis and on a color-by-color basis within each frame.

The areas through which light is transmitted in FIG. 3A correspond to the areas where the first electrodes 211 of the FIG. 3B are positioned. The areas between the pixels are not provided with the first electrodes 211 and a voltage is not applied thereto. Accordingly, the direction of arrangement of liquid crystals in these areas is not controllable, and thus these areas are shown as non-pixel areas.

Figure 4A:
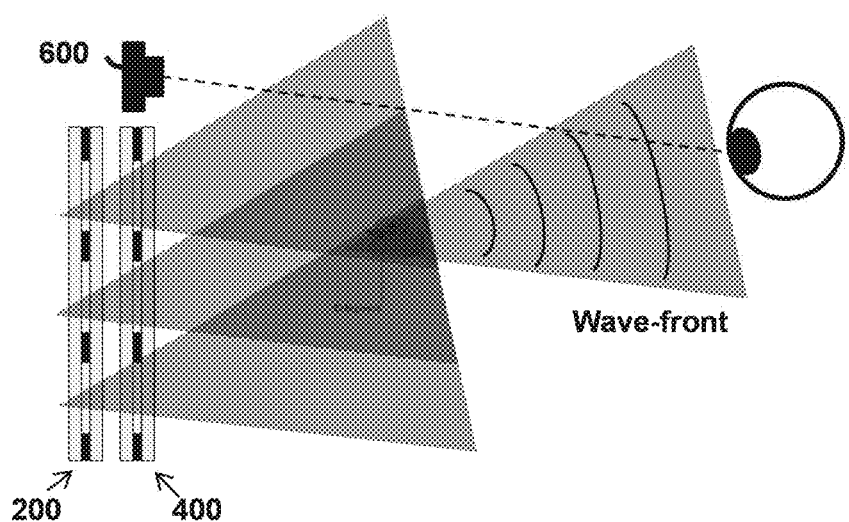
FIGS. 4A and 4B are a side view and a cross-section view illustrating a steering unit on a spatial light modulator.
Figure 4B:
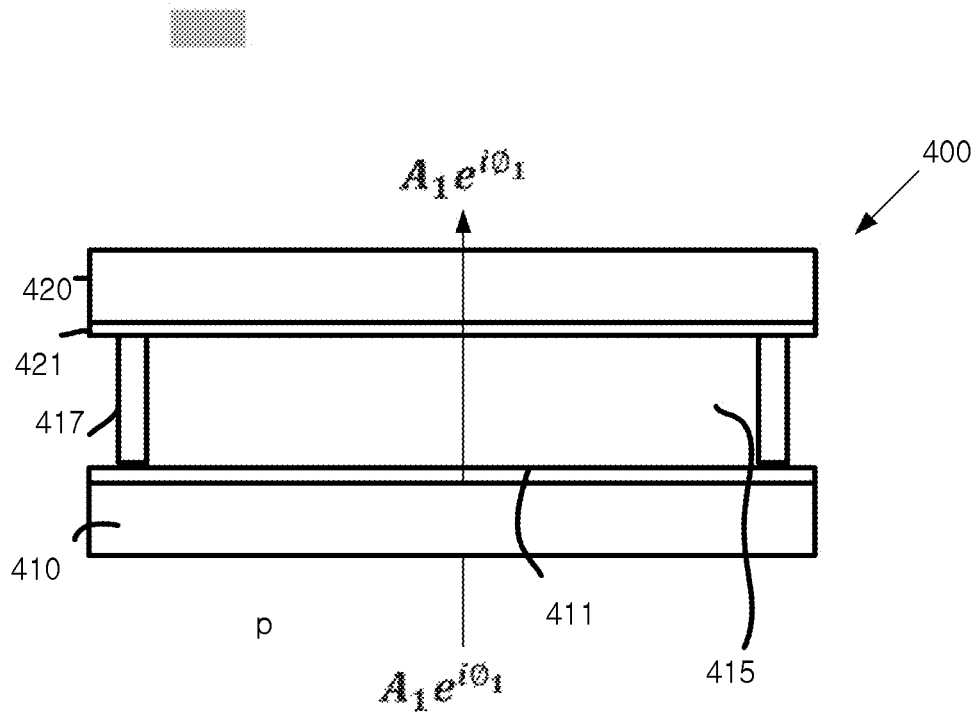

FIGS. 4A and 4B are a side view and a cross-sectional view illustrating a steering unit on the spatial light modulator.

As shown in FIGS. 4A and 4B, the steering unit serves to output light coming from the lower side by changing the projection wave front. The steering unit adjusts only the corresponding position of the projected light while maintaining the amplitude and phase of the holographic image information that the projected light has.

Referring back to the figures, an eye tracking unit 600 is provided to track the position of the viewer and makes the projected light correspond to the positions of the left eye and right eye of the viewer.

As shown in FIG. 4B, the steering unit 400 may also be a kind of liquid crystal panel, and has the same shape as shown in FIG. 3B or does not require adjustment of the amplitude or phase. Accordingly, third and fourth electrodes 411, 421 which are common electrodes in the form of a cylindrical electrode may be formed on the third and fourth substrates 410, 420 without differentiating between pixels.

In the example of FIG. 4A, the pixel positions of the steering unit 400 and the spatial light modulator 200 are aligned with the non-pixel positions. In this case, a polymer partition having no liquid crystal may be further provided at the non-pixel positions.

Figure 5A:
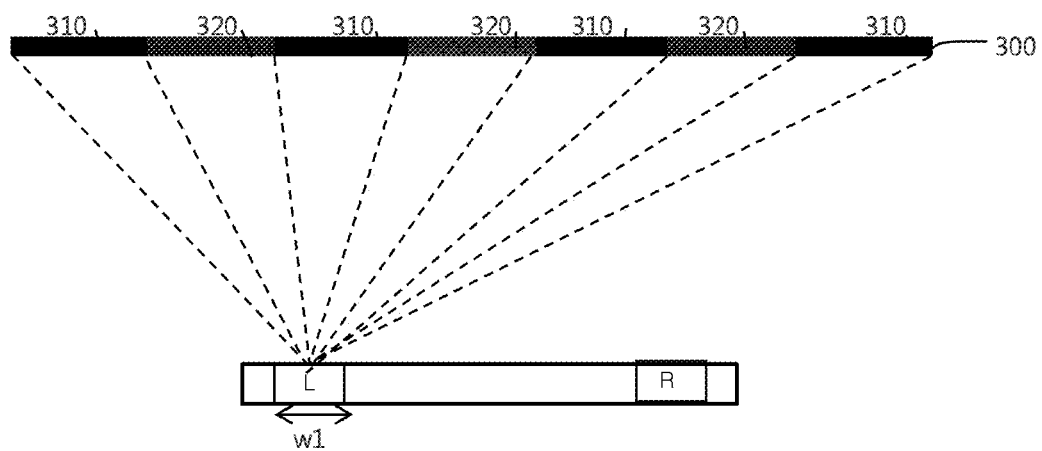
FIGS. 5A and 5B illustrate a first area and a second area of a diffractive interference film of a holographic display and formation of viewing windows thereof according to an aspect of the present disclosure.
Figure 5B:
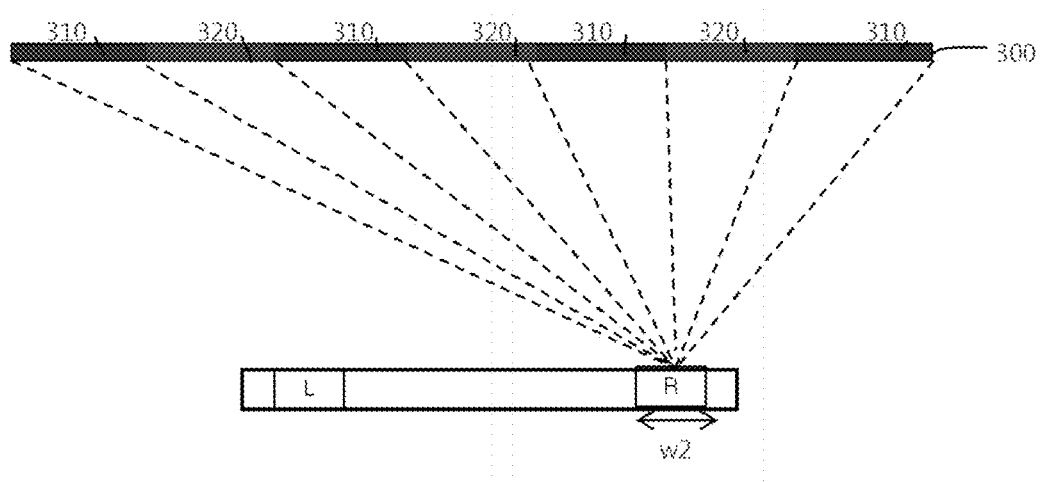

FIGS. 5A and 5B illustrate a first area and a second area of a diffractive interference film of a holographic display and formation of viewing windows thereof according to an aspect of the present disclosure.

As shown in FIG. 5A, the diffractive interference film 300 of a holographic display according to an aspect of the present disclosure concentrates a holographic image for the left eye at a first viewing window w1 positioned at a viewing distance through the first areas 310. As shown in FIG. 5B, the diffractive interference film 300 concentrates a holographic image for the right eye at a second viewing window w2 positioned at the viewing distance through the second areas 320.

Although the first and second viewing windows w1 and w2 are separately illustrated in FIGS. 5A and 5B according to the corresponding areas of the diffractive interference film 300, it should be noted that they are created at the same time. The distance between the viewing windows may correspond to the distance between both eyes of the viewer at the viewing-distance positions.

Figure 6:
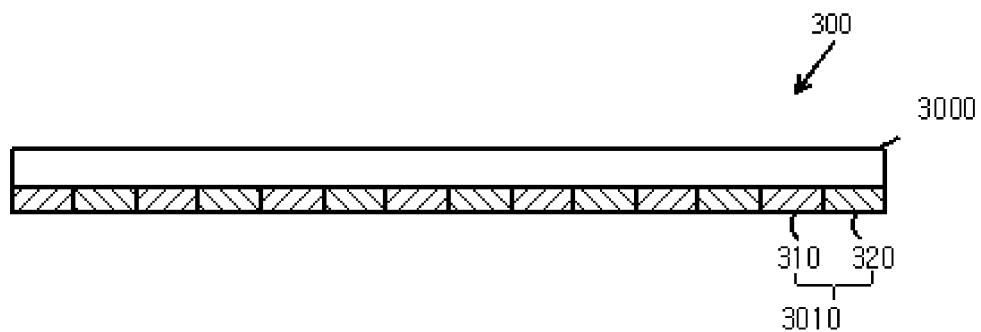
FIG. 6 is a cross-sectional view illustrating a diffractive interference film of a holographic display according to an aspect of the present disclosure.

FIG. 6 is a cross-sectional view illustrating a diffractive interference film of a holographic display according to an aspect of the present disclosure.

As shown in FIG. 6, the holographic display is formed by lamination of a base film 3000 and a photoreactive medium layer 3010. The photoreactive medium layer 3010 may be divided into the first areas 310 and the second areas 320 in the plane thereof, as shown in FIGS. 5A and 5B.

Herein, patterns are recorded in the photoreactive medium layer 3010 such that when reference light and object light are emitted (shown in FIGS. 8A and 8B), the photoreactive medium layer 3010 can diffract incident light in two specific directions. The pattern concentrates light from the first areas 310 toward the left eye, and light from the second areas 320 toward the right eye. The diffraction effect differs among the areas, and the areas from the same group may not have the same pattern. Accordingly, the first areas 310 may have first interference patterns which are different from each other, and the second areas 320 may have second interference patterns different from each other.

Hereinafter, description will be given of driving stereoscopic display of colors in a diffractive interference film concentrating light at two different positions for the left eye and the right eye as in the case of a holographic display according to an aspect of the present disclosure and driving stereoscopic display of colors in a diffractive interference film concentrating light only at one position in a comparison manner.

Figure 7A:
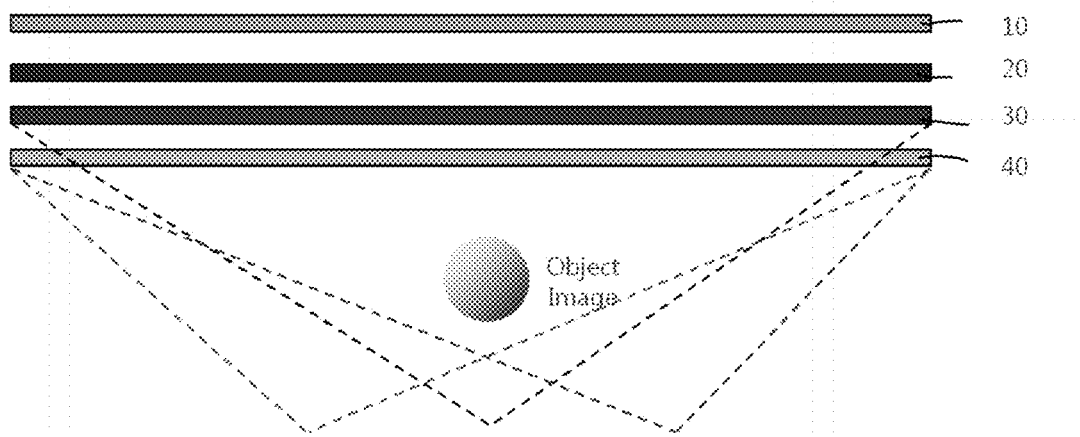
FIG. 7A is a schematic diagram illustrating a holographic display provided with a diffractive interference film configured to concentrate an image at one position.
Figure 7B:
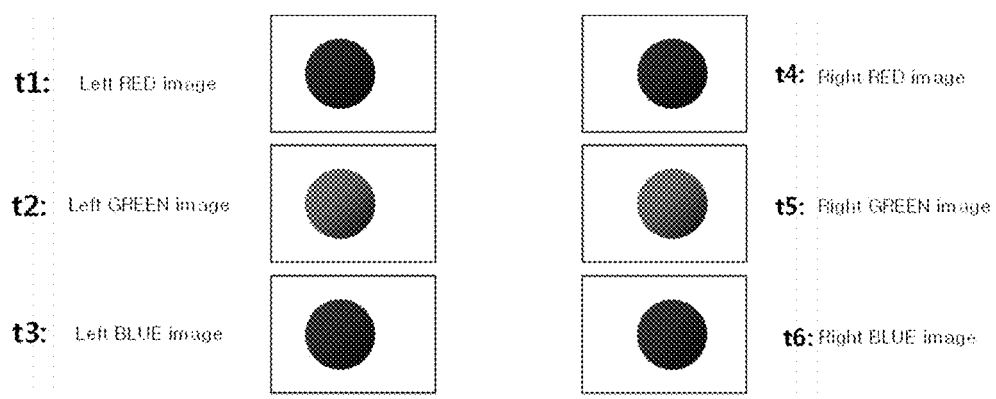
FIG. 7B illustrates images of the holographic display of FIG. 7A provided at different times.

FIG. 7A is a schematic diagram illustrating a holographic display provided with a diffractive interference film configured to concentrate an image at one position, and FIG. 7B illustrates images of the holographic display of FIG. 7A provided at different times.

As shown in FIG. 7A, the illustrated holographic display includes a backlight unit 10, a spatial light modulator 20, a diffractive interference film 30, and a steering unit 40, similar to the holographic display of FIG. 1. Hereinafter, a description will be given for a method of stereoscopic display of colors when the diffractive interference film 30 is configured to concentrate an image only at one position.

In this case, as shown FIG. in 7A, the diffractive interference film 30 has a diffractive interference pattern for concentrating light at one point. Since the viewing window formed by concentrating light at one point through the diffractive interference film 30 and the steering unit 40 is very small, the spatial light modulator 20 projects holographic image information for the left eye and holographic image information for the right eye at different times in displaying colors including red, green, and blue. That is, when a driving frequency of 60 Hz per frame is required for final display of the holographic display, the spatial light modulator 20 requires a driving frequency of 360 Hz (60 Hz×3 (R, G, and B colors)×2 (differentiation between the left eye and the right eye)) to implement the driving operation for color display and differentiation between the left eye and the right eye.

However, for the spatial light modulator, which typically uses a display panel such as a liquid crystal panel to adjust the amplitude and phase of the projected light, when driving at a high frequency such as 360 Hz is performed, it is impossible to quickly switch between the arrangement directions of liquid crystals by nature of the liquid crystals, and thus issues such as afterimage effect or flickering effect may be raised.

Accordingly, the holographic display of the present disclosure changes the form of the diffractive interference film 300 through area-divisional patterning such that holographic image information is concentrated at two different points. Thereby, only 180 Hz which is half of 360 Hz required in FIGS. 7A and 7B is required for implementation of the same stereoscopic display of colors. Under this condition, a commercial liquid crystal material may be driven. Accordingly, a need for separate development or change of a material is eliminated, and stereoscopic display of colors can be implemented using the commercial liquid crystal material.

Figure 8A:
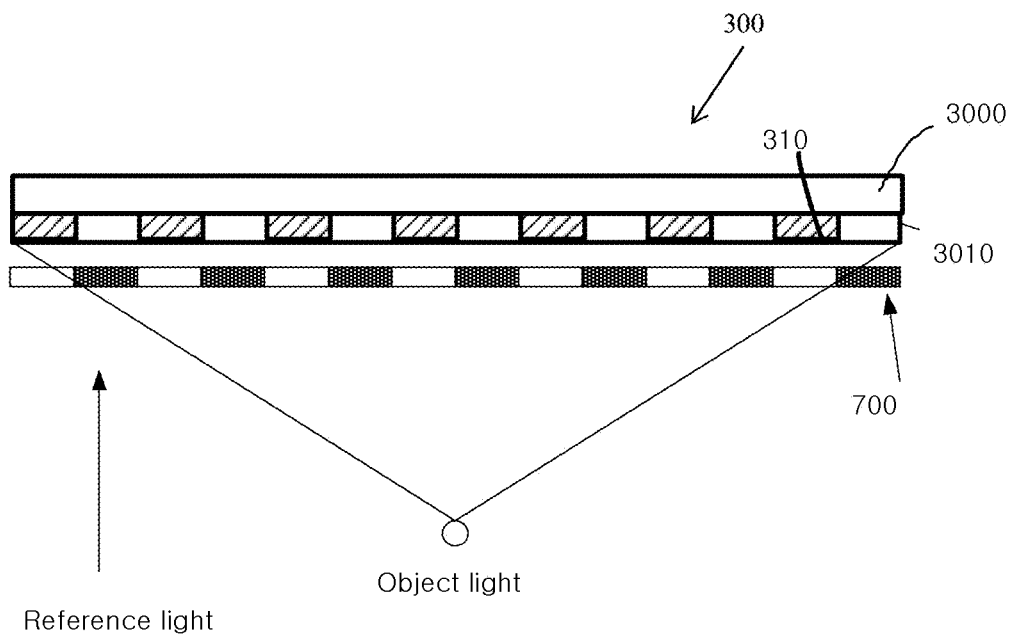
FIGS. 8A and 8B are cross-sectional views of processes illustrating a method of manufacturing a diffractive interference film of a holographic display according to an aspect of the present disclosure.
Figure 8B:
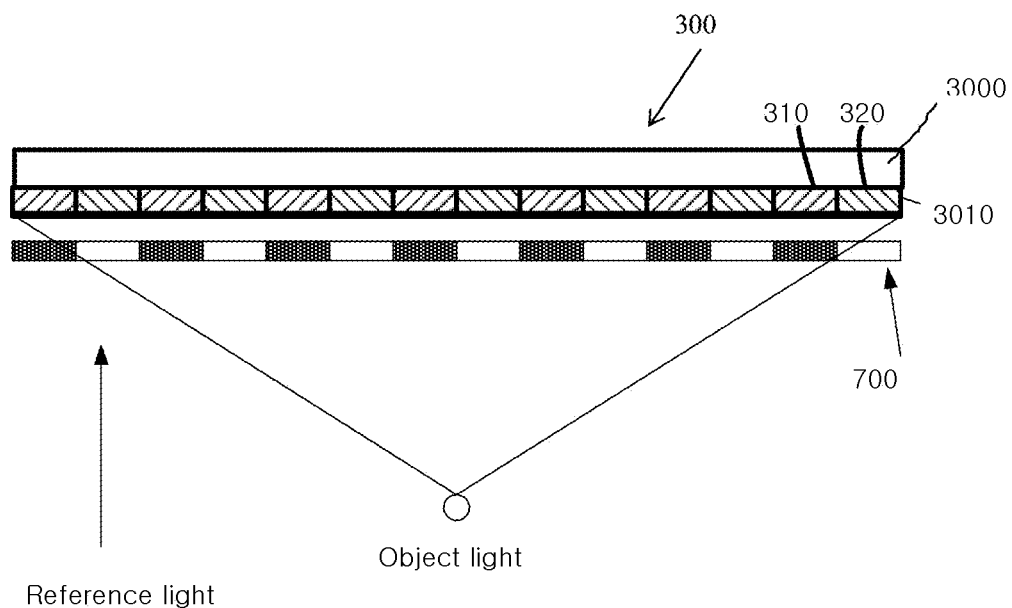

FIGS. 8A and 8B are cross-sectional views of processes illustrating a method of manufacturing a diffractive interference film of a holographic display according to an aspect of the present disclosure.

As shown in FIG. 8A, to manufacture a diffractive interference film of a holographic display according to an aspect of the present disclosure, a thin plastic film 3000 is prepared as a substrate, and then a photoreactive medium layer 3010 is applied to the upper portion of the base film 3000. Thereafter, a mask 700 having light shielding portions corresponding to the second areas is positioned on the photoreactive medium layer 3010.

Subsequently, reference light and object light are emitted onto the photoreactive medium layer 3010 to cause the first areas 310 of the open photoreactive medium layer 3010 to react to form first interference patterns capable of projecting light to a first position.

Subsequently, as shown in FIG. 8B, the light shielding portions of the mask 700 are shifted so as to be aligned with the first areas or a separate mask configured to cover only the first areas with the second areas left open is positioned on the photoreactive medium layer 3010. Then, the reference light and object light are emitted to react with the second areas 320 of the open photoreactive medium layer 3010. Thereby, second interference patterns capable of projecting light to a second position different from the first position are formed.

The holographic display of the present disclosure is intended to address the issue of afterimage effect or flickering effect which may be raised in performing a high-speed driving of stereoscopic display of colors using the liquid crystal panel-based spatial light modulator 200 and the steering unit 400. As the holographic display is provided with a diffractive interference film configured to concentrate light at two different positions, a necessary driving frequency may be reduced by half.

In particular, by adjusting the patterns of the diffractive interference film 300, which is a simple passive device, the driving frequency may be reduced by half. Accordingly, alteration of the spatial light modulator 200 or the steering unit 400, which serves as a switching device, is not required, and thus stereoscopic display of colors may be implemented at a low cost.

In addition, as an area divisional diffractive interference film is used to separate an object image created by the holographic display into two areas for both eyes to provide the object image to both eyes through the separated areas, the steering unit need not perform steering for the left eye and the right eye separately. Accordingly, the steering unit can be improved in terms of the limitation in the response speed.

As apparent from the above description, a holographic display of the present disclosure has the following effects.

First, in providing a diffractive interference film configured to concentrate an image at different positions for the left eye and right eye, a holographic image for the left eye and a holographic image for the right eye are supplied at the same time. Thereby, a frequency required for the spatial light modulator and the steering unit can be lowered. Accordingly, the holographic display can be driven at half of the driving frequency required in the conventional cases, and thus the flickering effect caused by a high frequency driving can be prevented.

Second, in particular, for liquid panel-based constructions such as a spatial light modulator and a steering unit, the afterimage effect may be addressed as the driving frequency is reduced by half. Accordingly, the need for differently performing the driving operation for the left eye and right eye is eliminated. Thereby, the limitations in commercialized liquid crystal materials related to a high-speed response can be overcome, and color display can be implemented simply by time divisional driving which is necessary for sequential driving of red, green, and blue colors. Accordingly, with the present disclosure, the conventional issues of the afterimage effect and the flickering effect can be resolved, and the visual quality of stereoscopically displayed colors can be enhanced.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A holographic display comprising:
    a backlight unit configured to transmit collimated light;
    a spatial light modulator over the backlight unit to supply first and second holographic image information;
    a diffractive interference film over the spatial light modulator,
    wherein the diffractive interference film has a first interference pattern configured to concentrate the first holographic image information from a plurality of first areas toward a first eye of a viewer and a second interference pattern configured to concentrate the second holographic image information from a plurality of second areas toward a second eye of the viewer, and the first interference pattern and the second interference pattern are alternately and laterally disposed along the diffractive interference film; and
    a steering panel over the diffractive interference film to shift the holographic image information from the diffractive interference film according to a position of a viewer.

2. The holographic display according to claim 1, wherein the diffractive interference film respectively concentrating the first and second holographic image information from the first and second areas reduces a required driving frequency of the holographic display by half.

3. The holographic display according to claim 2, wherein the diffractive interference film is formed by lamination of a base film and a photoreactive medium layer,
    wherein the photoreactive medium layer is divided into the first areas and the second areas.

4. The holographic display according to claim 3, wherein the first areas have first interference patterns different from each other, and
    the second areas have second interference patterns different from each other.

5. The holographic display according to claim 1, wherein the two different positions for the holographic image information from the diffractive interference film are spaced apart a distance, the distance being equivalent to a distance between the left eye and the right eye of the viewer.

6. The holographic display according to claim 1, wherein the spatial light modulator sequentially projects red holographic image information, green holographic image information, and blue holographic image information within one frame,
    wherein each of the red holographic image information, the green holographic image information, and the blue holographic image information has holographic image information for the left eye and holographic image information for the right eye.

7. The holographic display according to claim 1, wherein the spatial light modulator includes a first liquid crystal panel configured to receive reference light coming from an outside and project the collimated light from the backlight unit by modulating an amplitude and a phase of the collimated light.

8. The holographic display according to claim 1, wherein the steering panel comprises:
    an eye tracking unit configured to track the position of the viewer.

9. The holographic display according to claim 7, wherein the steering panel includes a second liquid crystal panel configured to horizontally shift the holographic image information from the diffractive interference film while maintaining a phase and an amplitude of the holographic image information.

10. The holographic display according to claim 1, wherein the diffractive interference film comprises a base film and a photoreactive medium layer on the base film, the photoactive medium layer diffracting incident light in two different directions.

11. The holographic display according to claim 1, further comprising a signal processor coupled to the spatial light modulator.

12. The holographic display according to claim 11, wherein the spatial light modulator is provided with holographic image information on a frame-by-frame basis and on a color-by-color basis within each frame.

13. The holographic display according to claim 1, wherein the spatial light modulator comprises:
    first and second substrates facing each other, each having a plurality of pixels;
    a first electrode arranged on each pixel of the first substrate,
    a second electrode positioned on the second substrate and faced the first electrode,
    a first liquid crystal layer positioned between the first and the second substrates; and
    a first seal pattern positioned at edges of the first and second substrates.

14. The holographic display according to claim 1, wherein the steering panel comprises:
    third and fourth substrates facing each other;
    a third electrode arranged on the third substrate;
    a fourth electrode positioned on the fourth substrate and faced the third electrode;
    a second liquid crystal layer positioned between the third and fourth substrates; and
    a second seal pattern positioned at edges of the third and fourth substrates.

15. A holographic display capable of representing stereoscopic color display, comprising:
    a diffractive interference film having a first interference pattern configured to concentrate first holographic image information from a plurality of first areas toward a first eye of a viewer and a second interference pattern configured to concentrate second holographic image information from a plurality of second areas toward a second eye of the viewer, and the first interference pattern and the second interference pattern are alternately and laterally disposed along the diffractive interference film.

16. The holographic display according to claim 15, further comprising a steering panel shifting the first and second holographic image information from the diffractive interference film according to a position of a viewer.

17. The holographic display according to claim 16, wherein the steering panel comprises an eye tracking unit configured to track the position of the viewer.

18. The holographic display according to claim 15, further comprising a spatial light modulator supplying holographic image information to be the first and second holographic image information.

19. The holographic display according to claim 15, wherein the diffractive interference film respectively concentrating the first and second holographic image information from the first and second areas reduces a required driving frequency of the holographic display by half.

20. The holographic display according to claim 15, wherein the diffractive interference film comprises a base film and a photoreactive medium layer on the base film, the photoactive medium layer diffracting incident light in two different directions.

* * * * *